(12) United States Patent
Makris et al.

(10) Patent No.: US 11,027,496 B2
(45) Date of Patent: Jun. 8, 2021

(54) ADHESIVE BONDING AND SEALING OF SEAMS AND JOINTS

(71) Applicant: Dr. Ing. h.c. F. Porsche Aktiengesellschaft, Stuttgart (DE)

(72) Inventors: Russos Makris, Leonberg (DE); Patrick Krauss, Mainhardt (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 164 days.

(21) Appl. No.: 16/263,342

(22) Filed: Jan. 31, 2019

(65) Prior Publication Data

US 2019/0232568 A1 Aug. 1, 2019

(30) Foreign Application Priority Data

Feb. 1, 2018 (DE) .......................... 102018102238.7

(51) Int. Cl.
| | |
|---|---|
| *B29C 65/00* | (2006.01) |
| *B29C 65/02* | (2006.01) |
| *F16B 11/00* | (2006.01) |
| *C09J 5/00* | (2006.01) |
| *B29C 65/48* | (2006.01) |

(52) U.S. Cl.
CPC .............. *B29C 65/02* (2013.01); *B29C 65/48* (2013.01); *B29C 66/1122* (2013.01); *B29C 66/43* (2013.01); *C09J 5/00* (2013.01); *F16B 11/006* (2013.01); *B29C 65/483* (2013.01); *B29C 66/1222* (2013.01)

(58) Field of Classification Search
CPC ....... B29C 65/48; B29C 65/483; B29C 65/52; B29C 66/1222; B29C 66/43
See application file for complete search history.

(56) References Cited

U.S. PATENT DOCUMENTS

| | | | |
|---|---|---|---|
| 5,292,066 A | 3/1994 | Torii et al. | |
| 6,092,691 A | 7/2000 | Schuerholz et al. | |
| 6,489,023 B1 * | 12/2002 | Shinozaki | C08L 63/00 428/355 EP |
| 6,682,818 B2 | 1/2004 | Czaplicki et al. | |
| 7,838,589 B2 * | 11/2010 | Finerman | C08G 59/18 524/560 |
| 8,356,571 B2 | 1/2013 | Rademacher et al. | |
| 9,221,323 B2 | 12/2015 | Dockweiler et al. | |
| 9,505,020 B2 | 11/2016 | Rademacher et al. | |
| 9,751,571 B2 | 9/2017 | Lwase et al. | |

(Continued)

FOREIGN PATENT DOCUMENTS

| | | |
|---|---|---|
| AT | 504429 A4 | 5/2008 |
| CN | 105722748 A | 6/2016 |

(Continued)

OTHER PUBLICATIONS

Chinese Office Action for Chinese Application No. 201910079540. 6, dated Dec. 12, 2020 with English Search Report, 8 pages.

*Primary Examiner* — Mark A Osele
*Assistant Examiner* — Nickolas R Harm
(74) *Attorney, Agent, or Firm* — RatnerPrestia

(57) ABSTRACT

The adhesive bonding and sealing by application of adhesive material and sealing material at corresponding seams and joints, wherein the adhesive material is arranged to rest directly, at least in part, on the sealing material.

11 Claims, 2 Drawing Sheets

(56) References Cited

U.S. PATENT DOCUMENTS

| | | | |
|---|---|---|---|
| 2005/0077683 A1* | 4/2005 | Comert | B60R 13/06 277/300 |
| 2007/0062642 A1 | 3/2007 | Reck et al. | |
| 2007/0193171 A1 | 8/2007 | Finerman et al. | |
| 2015/0367788 A1 | 12/2015 | Hudina et al. | |
| 2018/0201815 A1* | 7/2018 | Kelch | C08G 18/698 |

FOREIGN PATENT DOCUMENTS

| | | |
|---|---|---|
| DE | 3912920 A1 | 12/1989 |
| DE | 69223097 T2 | 3/1998 |
| DE | 19816990 C1 | 11/1999 |
| DE | 19936716 A1 | 2/2001 |
| DE | 10020679 A1 | 11/2001 |
| DE | 60204209 T2 | 10/2005 |
| DE | 102007037865 B3 | 9/2008 |
| DE | 102005058852 B4 | 12/2009 |
| DE | 102008027994 B3 | 4/2010 |
| DE | 10052108 B4 | 6/2013 |
| DE | 102013203302 B4 | 2/2015 |
| DE | 102016220237 A1 | 4/2018 |
| DE | 102015108119 A1 | 11/2018 |
| EP | 0237463 A2 | 5/1992 |
| EP | 0559106 A1 | 9/1993 |
| EP | 1074307 A2 | 2/2001 |
| EP | 0853502 B1 | 8/2001 |
| EP | 2495050 A1 | 9/2012 |
| EP | 2837430 A2 | 2/2015 |
| JP | 6172032 A | 4/1986 |
| JP | 2000192013 A | 7/2000 |
| JP | 6137034 B2 | 5/2017 |
| WO | 03072677 A1 | 9/2003 |
| WO | 2013045341 A1 | 4/2013 |

* cited by examiner

ADHESIVE BONDING AND SEALING OF SEAMS AND JOINTS

CROSS-REFERENCE TO RELATED APPLICATION

This application claims priority to German Patent Application No. DE 10 2018 102 238.7, filed Feb. 1, 2018, which is incorporated by reference herein in its entirety.

FIELD OF THE INVENTION

The invention relates to the adhesive bonding and sealing by application of adhesive material and sealing material to corresponding seams and joints, and to a method for adhesive bonding and sealing at seams and joints by application of adhesive material and sealing material at the corresponding locations.

BACKGROUND OF THE INVENTION

Adhesive bonding is being used more and more nowadays in particular for joining together the components for example of a body for a motor vehicle. The attempt is made here for the components which are to be adhesively bonded to be joined together largely, or as far as possible, in an automated manner—for example with the aid of robots. However, cavities, stepped formations and the like, formed by overlaps, shoulders, joins and the like, are located at a multiplicity of seams and joints, and these penetrate only incompletely, if at all, into the adhesive and/or sealing materials applied in an automated manner. In order for it to be possible, however, to achieve the full sealing which is imperative for motor vehicles, manual follow-up work is usually necessary in order to apply sealing material. This applies, for example, predominantly to the insertion by adhesive bonding of front and rear windows and the insertion by adhesive bonding of fixed side windows.

The prior art proposes a large number of solutions for the automated adhesive bonding and sealing of components.

DE 39 12 920 A1, which is incorporated by reference herein, discloses an apparatus for dispensing sealants and adhesives to body components in vehicle-body manufacturing, in the case of which a specifically configured nozzle can apply a composite strand, made up of two sealants and adhesives, from different storage means simultaneously to the adhesive-bonding location.

EP 0 559 106 81, which is incorporated by reference, herein, discloses, and describes, an appliance which is intended for applying adhesive or sealing substance to a workpiece, is guided in a vertically movable manner on a robot arm and has a pressure for applying adhesive or sealing substance which is kept essentially constant by means of compressed air during an application cycle.

DE 198 16 990 C1, which is incorporated by reference herein, discloses an apparatus for dispensing sealants and/or adhesives onto body components in vehicle-body manufacturing, in the case of which the nozzle device is provided with a separate drive means. This is intended to achieve the situation where the nozzle can be moved along any desired curves in the vicinity of a seam.

DE 199 36 716 A1, which is incorporated by reference herein, discloses an apparatus and a method for the application of liquid or pasty, hardenable plastic under pressure using a nozzle head, in the case of which the liquid or pasty plastic just applied is spread with a shaping function by a tool which is fitted on the nozzle.

DE 100 20 679 A1, which is incorporated by reference herein, discloses, and describes, a method and an apparatus for sealing joints and seams in motor-vehicle bodies using materials which are intended to be cured by using a specific type of radiation following the application.

DE 100 52 108 B4, which is incorporated by reference herein, discloses a method for sealing joint gaps between sheet-metal parts in the production of motor vehicles, in the case of which use is made of free-flowing plastic based on PVC with specific characteristics (viscosity between 1.1 and 1.4 Pas; yield point between 36 and 120 Pa; density between 1.22 and 1.29 g/cm$^3$). The plastic material is intended to flow into the joint gap which is to be sealed.

DE 10 2007 037 865 B3, which is incorporated by reference herein, discloses an apparatus and a method for the application of a sealing substance for example to a flanged seam of a motor-vehicle body, in the case of which the nozzle is arranged such that it can be pivoted, via a flexible rotary joint, in any desired directions when the adhesive or sealing material is being applied.

DE 10 2008 027 994 B3, which is incorporated by reference herein, discloses, and describes, an apparatus and a method for applying in particular sealing substance to a flanged seam of a body component of a motor vehicle, in the case of which the nozzle, for the purpose of dispensing the coating means, is arranged on a repeatedly curved nozzle carrier, which is also intended to provide for coating on that side of a component which is directed away from the tool carrier.

DE 10 2013 203 302 B4, which is incorporated by reference herein, discloses a method for applying a sealing substance to a workpiece, in the case of which the workpiece can be heated inductively in order for the sealing substance to be cured.

DE 692 23 097 T2, which is incorporated by reference herein, has disclosed a method for the controlled application of a sealing substance by means of an industrial robot, in the case of which the robot is intended to execute a multiplicity of method steps in dependence on the movement speed of the robot arm in order to achieve uniform application.

EP 0 853 502 B1, which is incorporated by reference herein, discloses a method and an apparatus in conjunction with the automated production of motor-vehicle bodies. The intention here is for the sealing or adhesive substance to be proportioned by way of temperature control of the proportioning unit and of the outlet valve.

EP 1 074 307 B1, which is incorporated by reference herein, discloses, and describes, an apparatus and a method for the application of sealing or bonding material by means of a nozzle head which is subjected to the action of pressure, with the intention being for the material to be activated photochemically via a UV light source.

DE 10 2005 058 852 B4, which is incorporated by reference herein, discloses a further apparatus and a method, which can be executed via said apparatus, for the application of sealing or adhesive materials, in the case of which the pressure for discharging the material should be regulated via a sensor device.

EP 2 495 050 A1, which is incorporated by reference herein, discloses, and describes, a nozzle for the application of pasty media for the fine sealing of clinch seams, the nozzle head being of a specific design.

A specific design of the nozzle head for the application of sealing materials is likewise disclosed, and described, in EP 2 837 430 A2, which is incorporated by reference herein.

WO 2013/045341 A1, which is incorporated by reference herein, proposes a sealing device for the bodyshell opening in the tailgate of a motor vehicle, in the case of which, prior to the outer wall of the tailgate being connected to the inner wall of the tailgate, a gap-filling part is moved into a closure position, said gap-filling part, following the connection operation, closing in a water-tight manner, or sealing, the remaining gap on its own or together with a PVC edge-fold sealing means.

JP 613 70 34 B2 and JP 61 720 32 B2, both of which are incorporated by reference herein, also disclose, and describe, nozzle structures which can discharge sealants or adhesives.

SUMMARY OF THE INVENTION

Described herein is an apparatus and a method which make it possible to achieve an automated adhesive-bonding and sealing operation without the need for any follow-up work, e.g. by hand.

The adhesive material is arranged at the corresponding seams and joints to rest directly, at least in part, over the sealing material. The adhesive material here is a material of higher viscosity than the sealing material, which is an elastic, solvent-free, liquid-curing material based on polyurethane, with a viscosity which is lower than that of the adhesive material and preferably smaller than 60 g/min at room temperature.

The adhesive material can preferably be applied in the form of a compact bead to the locations which are to be adhesively bonded.

The application of the tough, relatively stiff, compact adhesive material resting on the elastic/soft, free-flowing sealing material can preferably take place in crossover form, in dependence essentially on the seams and joints. It is likewise conceivable for the adhesive material to be applied, e.g. In the form of an adhesive bead, essentially in parallel form to the sealing material. This application of the adhesive material resting on the sealing material causes the adhesive material to distribute the sealing material in the spaces which are to be sealed at the seams and joints.

In the case of a first method according to aspects of the invention, first of all the soft/elastic sealing material (see the preferred material characteristics above) is applied at the seams or joints of first components which are to be joined together. Immediately following this, the adhesive material is applied, at least in part, (at the locations which are to be sealed) preferably in the form of a compact and tough adhesive bead made of adhesive material of higher viscosity than the sealing material applied immediately beforehand, and then the component/components to be adhesively bonded to the adhesive material is/are pressed on and the sealing and/or adhesive material are/is cured.

In the case of an alternative method according to aspects of the invention, it is likewise the case that first of all the soft/elastic sealing material is applied at seams and joints of first components which are to be joined together; immediately following this, the adhesive material is applied in the form of an adhesive bead to at least one second component, which is to be adhesively bonded to the one first component, in a manner corresponding to the applied sealing material and such that it covers over the same. Thereafter, the components which are to be joined together are pressed together and the adhesive and sealing material is cured.

The adhesive bonding and sealing at seams and joints is preferably used for body components of motor vehicles.

The considerably higher viscosity of the adhesive material used according to aspects of the invention, that is to say the higher level of toughness thereof in contrast to the more liquid sealing material with considerably lower viscosity than the adhesive material, means that a compact bead of adhesive material, applied immediately following the application of the sealing material, causes the latter to penetrate or flow into the seams and joints which are to be sealed and therefore ensures improved sealing.

Advantages, features and details of the solution according to aspects of the invention for the adhesive bonding and sealing of seams and joints, and for a method for corresponding adhesive bonding and sealing, can be gathered from the following description of exemplary embodiments, which are illustrated schematically in the figures of a drawing. The above described features and combinations of features, as shown hereinbelow in the drawing, and the features and combinations of features described with reference to the drawing can be used not just in the respectively indicated combination, but also in other combinations or in isolation, without the scope of the invention being exceeded.

DETAILED DESCRIPTION OF THE INVENTION

Figure 1:
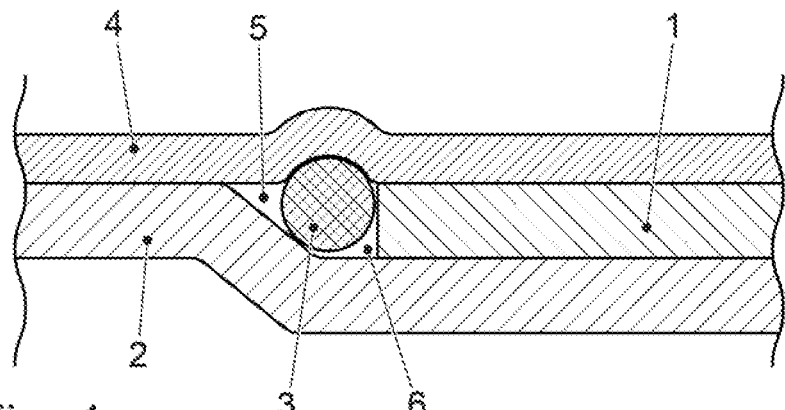
FIGS. 1-6 depict joints for joining body components together.

FIGS. 1-6 of the drawing show overlaps, shoulders, and joints as are often to be found for example in body components in motor vehicles. This schematic illustration, however, is not in any way definitive.

FIG. 1 shows a joint in which a first body component 1 has a second body component 2 engaging over it in overlapping fashion at the joint. The joint is intended to be sealed by sealing material 3. For the purpose of adhesively bonding the components 1 and 2 to further body components (not illustrated in the drawing), an adhesive bead 4 is applied to the body components 1 and 2 and over the joints, and thus also over the sealing material 3. If use is made of correspondingly tough sealing material 3 and similarly tough adhesive material for the adhesive bead 4, it is sometimes the case that the sealing material cannot be introduced fully (see schematic illustration) into the cavities formed at the joint, and this results in unsealed locations, for example the locations 5 and 6, remaining. Such locations require high-outlay, possibly manual, sealing prior to the adhesive bead 4 being applied automatically.

Figure 2:
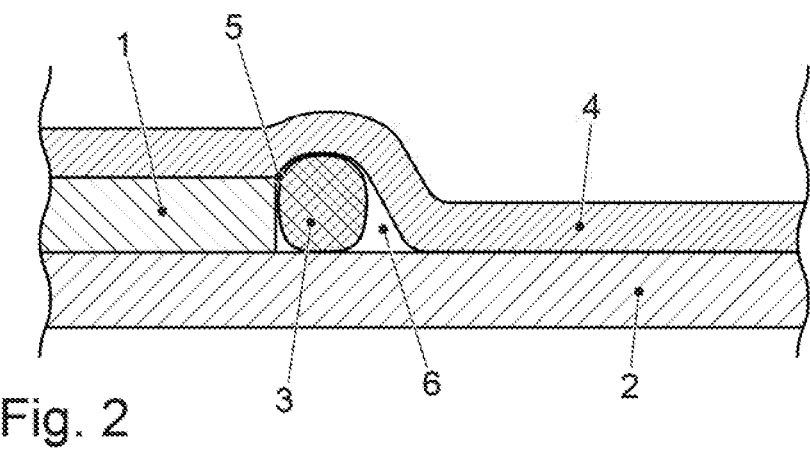
Figure 3:
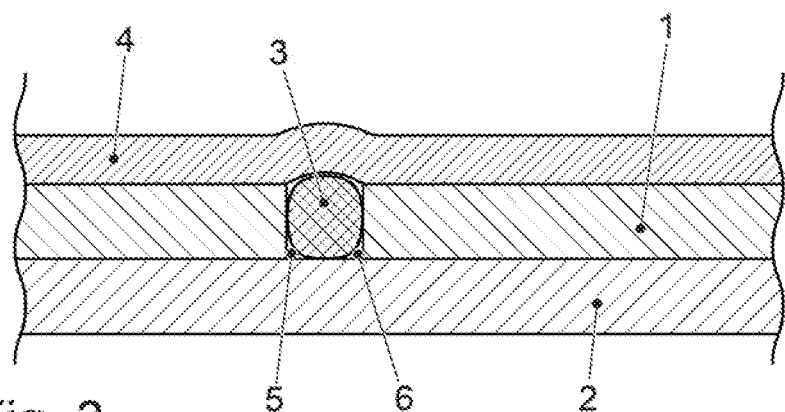

This situation is similar for alternative joints as are illustrated in FIGS. 2 and 3—the same reference signs are used for the same parts. Here too, cavities 5 and 6 form the joints and have to be sealed subsequently, possibly by hand.

Figure 4:
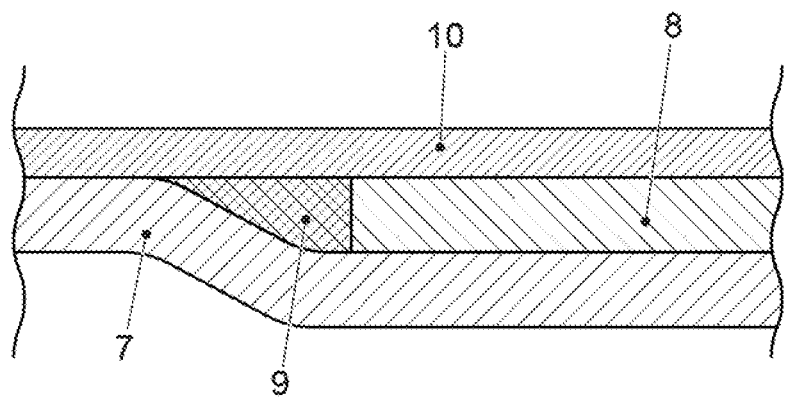

The invention uses straightforward means to solve the prior-art sealing problem illustrated in FIGS. 1-3. In FIG. 4, a first body component 7 has been made to overlap with a second body component 8. According to the method of the invention, the more free-flowing sealing material 9, with lower viscosity than the thick adhesive material (adhesive bead 10), is introduced at the joint and, immediately following this, a compact adhesive bead 10 made of considerably thicker adhesive material, which ranges from being hardly free-flowing to not being free-flowing at all, is applied over the joint. The free-flow capability of the sealing material 9 is one factor which allows the latter to adapt itself over the surface area of the entire cavity at the joint, and to seal said cavity in full. This adaptation, with the aim of full sealing, is assisted, on the one hand, by the contact pressure applied to the sealing material 9 by the adhesive bead 10 alone, as a result of the hard/tough, high-viscosity adhesive material, and, on the other hand, by the following operation of the component (not illustrated in the drawing) being pressed on, the intention being for said component to be adhesively bonded to the body components 7 and 8 via the adhesive bead 10.

Figure 5:
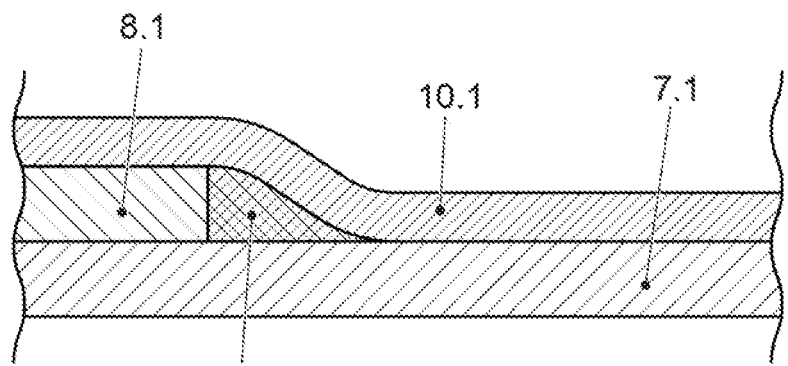
Figure 6:
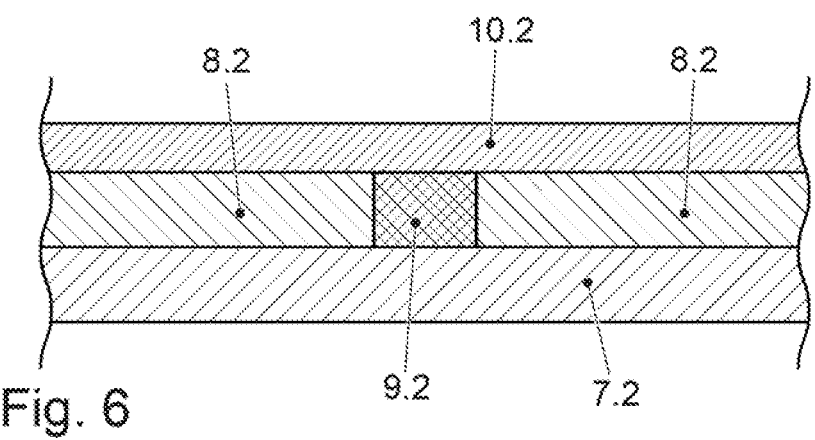

The situation is similar for differently formed joints (see FIGS. 5 and 6 in this respect). On account of its liquid structure, the sealing material 9.1, 9.2 for sealing the joints between the body components 7.1, 7.2 and 8.1, 8.2 respectively, is pressed by the hard/tough material of the adhesive bead 10.1, 10.2, respectively, into all the cavities which are formed at the joint, and are to be sealed.

According to an alternative method, it is possible for the sealing material 9, 9.1, 9.2 to be applied to at least one first of a number of parts 7, 7.1, 7.2, 8, 8.1, 8.2 which are to be joined together, while at the same time, or immediately following this, the adhesive material in the form of an adhesive bead 10, 10.1, 10.2 is applied to the locations, which are to be sealed of at least one second component 7, 7.1, 7.2, 8, 8.1, 8.2 in a manner corresponding to the applied sealing material 9, 9.1, 9.2 and such that it essentially covers over the same.

What is claimed is:

1. A method of adhesive bonding and sealing comprising:
   directly applying sealing material at either seams or joints;
   applying adhesive material at the seams or joints,
   arranging the adhesive material to rest directly, at least in part, on the sealing material, and
   causing the sealing material to flow into the seams or joints under the weight of the adhesive material as a result of the adhesive material having a higher viscosity than the sealing material in a liquid form of both the sealing material and the adhesive material.

2. The method of claim 1, wherein the adhesive material is a material of higher viscosity than the sealing material, which is an elastic, solvent-free, liquid-curing material.

3. The method of claim 1, further comprising applying the adhesive material in the form of a bead.

4. The method of claim 1, further comprising applying the adhesive material to the sealing material in substantially crossover form.

5. The method of claim 1, further comprising applying the adhesive material to the sealing material in substantially parallel form.

6. The method of claim 1, wherein the seams and joints are defined on body components of motor vehicles.

7. A method for adhesive bonding and sealing comprising:
   applying elastic sealing material at or in seams or joints of at least one first component;
   applying adhesive material in the form of an adhesive bead to the sealing material immediately following the step of applying the sealing material such that the adhesive bead substantially covers the sealing material at locations which are to be sealed;
   causing the sealing material to flow into the seams or joints under the weight of the adhesive material as a result of the adhesive material having a higher viscosity than the sealing material in a liquid form of both the sealing material and the adhesive material;
   pressing at least one second component, which is to be adhesively bonded to the adhesive material, onto the first component with the sealing and adhesive materials applied; and
   curing the sealing material and the adhesive material.

8. The method of claim 7, wherein the seams and joints are defined on body components of motor vehicles.

9. A method for adhesive bonding and sealing comprising:
   applying elastic sealing material at or in seams or joints of at least one first component;
   immediately following the application of the sealing material, applying adhesive material in the form of an adhesive bead to at least one second component, which is to be adhesively bonded to the at least first component, in a manner corresponding to the applied sealing material at locations which are to be sealed, and such that the adhesive material covers over the sealing material, the result of said application being that, when the at least second component is joined together with the at least first component, the adhesive material substantially covers the sealing material at locations which are to be sealed;
   causing the sealing material to flow into the seams or joints under the weight of the adhesive material as a result of the adhesive material having a higher viscosity than the sealing material in a liquid form of both the sealing material and the adhesive material;
   pressing the at least second component, with the adhesive material applied thereto, onto the at least first component with the sealing material applied; and
   curing the sealing material and the adhesive material.

10. The method of claim 9, wherein the seams and joints are defined on body components of motor vehicles.

11. The method of claim 9, wherein the adhesive material is applied directly over and on top of the first component, the second component and the sealing material.

* * * * *